Patented Mar. 31, 1931

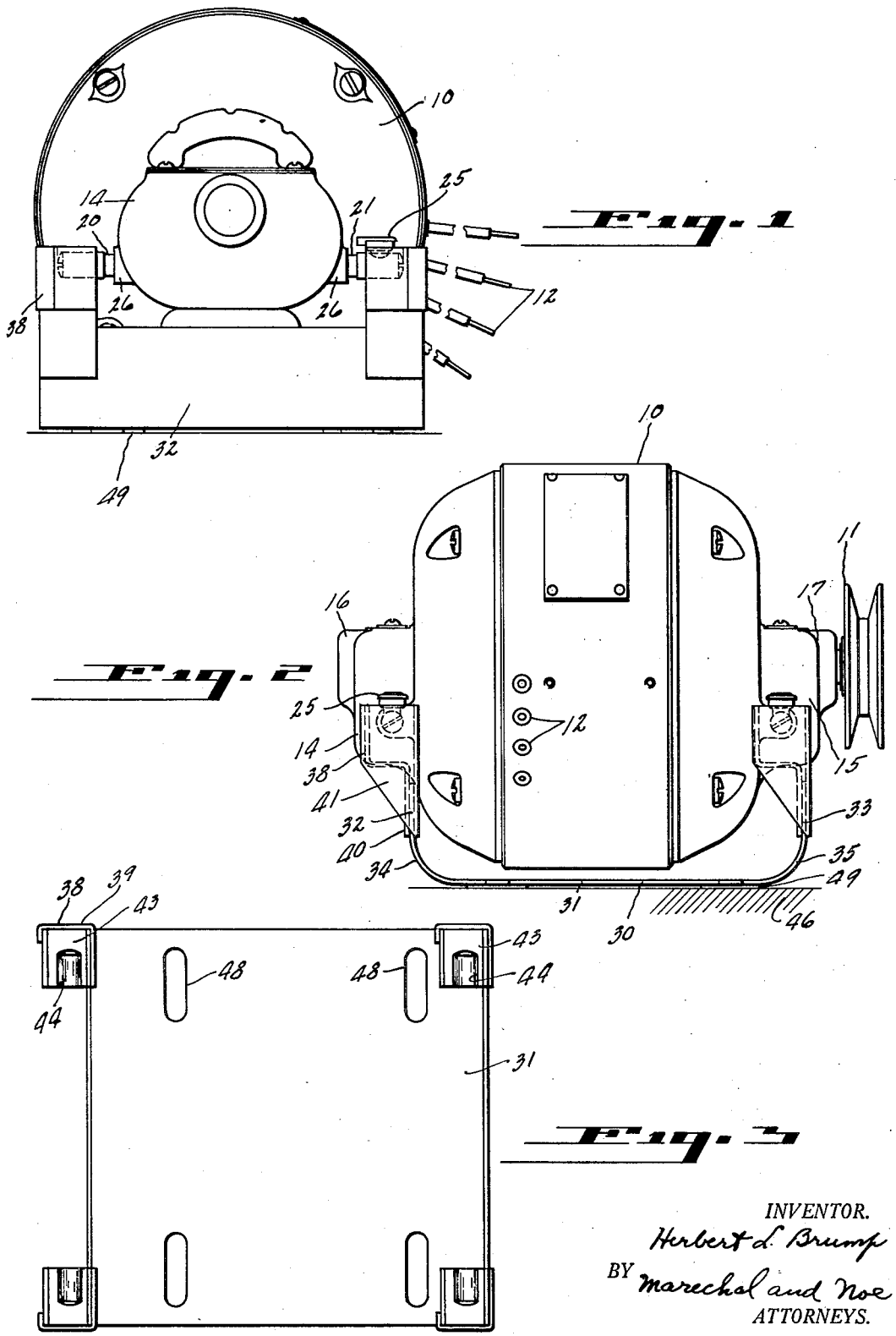

1,798,719

UNITED STATES PATENT OFFICE

HERBERT L. BRUMP, OF DAYTON, OHIO, ASSIGNOR, BY MESNE ASSIGNMENTS, TO DELCO PRODUCTS CORPORATION, OF DAYTON, OHIO, A CORPORATION OF DELAWARE

MOTOR MOUNTING

Application filed September 30, 1927. Serial No. 223,123.

This invention relates to motor mounts of the type adapted to support electric motors of small size.

One object of the invention is the provision of a motor mount of this character in which the transmission of vibration and noise will be reduced or eliminated.

A further object of the invention is the provision of a motor mount which will be cheap and light in construction and capable of convenient handling, and adapted to be used in a convenient manner.

Other objects and advantages of the invention will be apparent from the following description and from the drawings, in which—

Fig. 1 is an end view of a motor and motor mount in accordance with this invention;

Fig. 2 is a side elevation corresponding to Fig. 1; and

Fig. 3 is a top plan view of the motor mount with the motor removed.

The invention is shown applied to electric motors of small size such as are used in electrical refrigeration or in a large number of other capacities in which the motor is connected by a belt or other similar driving means to the apparatus to be driven thereby.

In the drawings, as designated by reference numerals, the electric motor 10, of small or fractional horse-power and of any suitable type, is provided with a pulley or driving wheel 11 at one end of the motor shaft by which the motor may be connected to any suitable device to be operated. The electrical supply wires are indicated at 12 and it is understood that these supply wires are adapted to be connected to any suitable source of alternating or direct current. At each end of the motor, and located well above the bottom of the motor is a projection, as indicated at 14 and 15 which serves as an oil reservoir to supply oil to the bearings 16 and 17 at the ends of the motor shaft. The oil reservoir 14 is provided with a pair of outwardly extending projections 20 and 21 preferably of cylindrical form, and the other oil reservoir 15 is provided with a similar pair of projections. One of these projections of each pair may be made hollow and provided with an oil admission opening which may be closed by a hinged cap 25 so that oil may be supplied through this projection to maintain a suitable level within the oil reservoir. The projections 20 and 21 are preferably provided with external threads on their inner ends which engage in corresponding threads in the bosses 26 at the sides of each of the large projections or oil reservoirs 14 and 15.

The motor is mounted upon the support, indicated generally 30, so that the transmission of noise and vibration will be eliminated or reduced, and the support 30 itself is furthermore preferably constructed especially when used with small or fractional horsepower motors, so that it has sufficient flexibility to further absorb vibration in a yielding or shock absorbing manner without permitting material motion or vibration of the motor endwise such as might create additional objectionable periodic motion of the entire motor. The support is preferably constructed of sheet material such as sheet steel and comprises a bottom portion 31 and the two upwardly extending side portions 32 and 33 which are connected by the curved corner portions 34 and 35, these portions being shown formed of a single piece of sheet metal bent into form to obtain a support of substantially flattened U-shape. The corner portions 34 and 35 as shown being thin and unstiffened provide for considerable flexibility permitting perceptible movement of the motor and of the end portions 32 and 33 in relation to the bottom portion 31.

Adjacent each corner of the motor mount 30 and provided at the upper outer ends of the upright portions 32 and 33 of the motor mount are boxes 38 which may be formed of separate bent strips of sheet metal 39, 40 and 41 which are welded together and to the upper corner of the sides 32 and 33 to provide a box which is open at its top and at its inner side. Within each of these boxes 38 is a shock absorbing cushion part preferably formed as a rubber block 43, the upper surface of which is preferably flush with the upper surface of the box. The upper surface of the block 43 is provided with a depression 44 which is preferably curved at its lower portion to receive the lower curved half of a projection 20 or 21, and the depressions in the rubber block extend laterally a sufficient distance so the projections 20 and 21 at one end of the motor are neatly received in the depressions in the blocks at the corresponding end of the support, and the motor is thus yieldingly restrained against lateral movement and against vibrational movement in any direction. The supporting points at each end of the motor are spaced considerably apart and from the axis of rotation of the motor, and it will be noted that the motor is supported at points well above the bottom of the motor and comparatively close to the horizontal plane passing through the axis of rotation. The motor is thus permitted to vibrate without transmitting such vibrations to the support 30 due to the yielding manner in which the motor is supported. Such vibrations as are transmitted to the upwardly extending portions 32 and 33 of the support fail to reach the base or floor 46 to which the support 30 may be attached, by reason of the flexibility of the corner portions 34 and 35 as well as the flexibility of the other flat sheet metal parts of the support.

The bottom section 31 of the motor support has provisions by which it may be attached in place on a suitable floor or base 46. Such provisions are herein shown as the slotted openings 48 which are located adjacent the corner portions of the bottom section 31 and considerably spaced both laterally and longitudinally from the center of the motor. These slots are adapted to receive attaching bolts which may be fastened in the base or floor 46. In order to permit the maximum degree of freedom of vibration of the different parts of the motor support, spacing washers or blocks 49 of rubber, fiber or metal are provided between the floor or base 46 and the under surface of the bottom section 31. These blocks are comparatively small and are rather widely spaced apart so that the central portions of the bottom section 31 are permitted to move or vibrate freely in a vertical direction and permit such vibrational movements as may be transmitted to the side sections of the support to be absorbed by the slight vibrational movements which may be imparted to the support, and particularly to the curved corner portions 34, 35 and the central portion of the bottom section 31.

The motor is preferably connected to the device which it drives by a belt or other connection so that the power is taken off laterally, or in a way so that the load is located at the side of the motor. Belt adjustments are thus permitted by the transversely elongated slots 48 which permit the lateral adjustment of the position of the motor, and if the pull of the belt is in a lateral direction the motor will not be raised from its position on the rubber cushion blocks but may be firmly seated thereon so as to be restrained in a yielding manner against lateral and downward movements or vibrations.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A motor mounting comprising a support having side portions adapted to support opposite ends of a motor, said side portions having curved parts of sufficient thinness to give them considerable flexibility for the absorption of motor vibrations, and having flat parts adapted to extend parallel along opposite ends of a motor, and a pair of yielding means on upper portions of said flat parts for supporting a motor at points laterally spaced from the motor shaft and well above the bottom of the motor.

2. A motor mounting comprising a sheet metal support of flattened U-shape embodying a base section and opposing side sections joined together by a curved thin sheet of material having considerable flexibility for the absorption of motor vibrations, shock absorbing means on each of said side portions for receiving parts of an electric motor to support the motor adjacent points above the bottom thereof, and means for supporting said base section at points spaced from the center thereof to permit flexing of the center portion thereof.

3. An electric motor mounting comprising a support embodying outwardly extending end members of thin material having considerable flexibility, shock absorbing parts mounted in horizontally spaced relation on each end member adjacent an upper portion thereof, said parts having depressions shaped to receive parts of an electric motor to yieldingly support said motor in place.

4. A motor mounting comprising a support embodying outwardly extending end members having curved portions engaged to absorb motor vibrations, four horizontally spaced yielding cushion blocks mounted at the corners of said support on said end members and defining the four corners of a horizontal rectangle, said blocks having seats adapted to receive parts of an electric motor.

5. A motor mounting comprising a sheet metal support of flattened U-shape having a width commensurate with the width of the motor, four horizontally spaced support pieces formed of yielding material and defining the four corners of a horizontal rectangle, means holding said pieces on opposite sides of the upper ends of the support, said pieces having portions engaging an electric motor to yieldingly support the motor at points near the horizontal axial plane and spaced laterally from the motor axis.

6. In combination an electric motor having a pair of posts projecting from each end of the motor at points spaced laterally from the motor axis and well above the bottom of the motor, and a metal support for the motor having upwardly extending end portions lying along opposite ends of the motor, and support pieces formed of yielding material and interposed between said posts and spaced points at the top of said end portions.

7. In combination an electric motor having a pair of spaced posts projecting from each end of the motor at points substantial distances laterally with respect to the motor axis and well above the bottom of the motor, a frame supporting said motor and comprising a sheet metal base portion of substantially flattened U-shape, and rubber pieces interconnecting said posts and spaced points on the upper portions of opposite ends of said frame.

In testimony whereof I hereto affix my signature.

HERBERT L. BRUMP.